United States Patent [19]

Kishi et al.

[11] Patent Number: 5,055,754
[45] Date of Patent: Oct. 8, 1991

[54] APPARATUS FOR DETECTING AN EXCESSIVE POSITION ERROR IN A SERVO SYSTEM

[75] Inventors: Hajimu Kishi, Hino; Naoki Fujita, Minamitsuru; Haruyuki Ishikawa, Shinjuku, all of Japan

[73] Assignee: Fanuc Ltd., Minamitsuru, Japan

[21] Appl. No.: 455,311

[22] PCT Filed: May 30, 1989

[86] PCT No.: PCT/JP89/00540

§ 371 Date: Jan. 10, 1990

§ 102(e) Date: Jan. 10, 1990

[87] PCT Pub. No.: WO89/12266

PCT Pub. Date: Dec. 14, 1989

[30] Foreign Application Priority Data

Jun. 1, 1988 [JP] Japan ................... 63-132553

[51] Int. Cl.$^5$ ........................ G05B 23/02
[52] U.S. Cl. ........................ 318/565; 318/600; 318/567; 318/571; 364/174.35
[58] Field of Search ............ 318/565, 600, 567, 571; 364/474.35

[56] References Cited

U.S. PATENT DOCUMENTS 4,272,711  6/1981  Fukuyama et al. ............ 318/565
4,496,889  1/1985  Fukuzama et al. ............ 318/565
4,908,555  1/1990  Ikeda et al. .................... 318/567

Primary Examiner—William M. Shoop, Jr.
Assistant Examiner—Saul M. Bergmann
Attorney, Agent, or Firm—Staas & Halsey

[57] ABSTRACT

A detection apparatus is provided which is capable of detecting an excessive position error in a servo system in an appropriate manner over a wide servomotor rotational rate region, so as to accurately and immediately determine an overload state of a servomotor and the like. A permissible maximum value of the position error is obtained by first obtaining a product of a proportional coefficient set beforehand and a maximum value of pulse distribution amounts—a number of movement command pulses distributed from a central processing unit of a numerical control unit. The pulse distribution amounts are respectively stored in a table provided in a memory. The product is then, second, divided by a position loop gain. The central processing unit then determine that an excessive position error has occurred when an actual position error read from an axis controller is greater than or equal to the permissible maximum value. An excessive position error occurs in the servo system due to, for example, an abnormality of the servo system, an overload state of the servomotor, or an interference between a machine movable section and a foreign object. When an excessive position error has occurred, the central processing unit causes the servomotor to stop and an alarm message to be displayed.

8 Claims, 2 Drawing Sheets

| RECORD NUMBER | PULSE DISTR. AMOUNT |
|---|---|
| 0 | V0 |
| 1 | V1 |
| 2 | V2 |
| ⋮ | ⋮ |
| i | Vi |
| ⋮ | ⋮ |
| n | Vn |

…

APPARATUS FOR DETECTING AN EXCESSIVE POSITION ERROR IN A SERVO SYSTEM

TECHNICAL FIELD

The present invention relates to a detection apparatus for appropriately detecting an excessive position error in a servo system.

BACKGROUND ART

In general, various machines having one or more operating sections each of which is driven by a servomotor, e.g., industrial robots, NC machine tools, etc., are provided with servo systems for respective axes of the machine, and the servo systems responding to a movement command supplied from a numerical control unit. Typically, each of the servo systems is arranged to periodically distribute pulses in response to a movement command. Namely, the servo system distributes pulses whose number corresponds to a target movement amount of a respective servomotor with one pulse distribution time period in such a manner that a moving speed of the servomotor is uniformalized during that period, to thereby drive the servomotors for the individual axes and hence the various machine operating sections to their target positions.

During a machine operation, each of the servo systems checks the error amount between a target moving position and an actual moving position of an associated servomotor periodically, detects the excess of the actual position error, and regards it as an occurrence of an abnormality, e.g., overload of the servomotor, interference between the machine operating section concerned and a foreign object or the like, so as to stop the drive of the associated servomotor, whereby the respective servo systems and the servomotors are protected.

In case that a distal end of a complicated mechanism is moved along a certain path at a constant speed, there often occurs a change in a target moving amount and in a target moving speed of a respective axis servomotor. On this occasion, a response delay in a servo system increases as the target moving speed is increased. In this respect, conventionally, a permissible position error is fixedly set in dependence on the maximum rotational rate of an associated servomotor, so as to prevent an increased actual position error due to a normal response delay from being erroneously determined as occurrence of an abnormality even if the maximum response delay appears in the servo system when the target moving speed corresponding to the maximum rotational rate is specified.

However, according to the aforesaid prior art, even if a certain movable section of a machine interferes with a foreign object during its low-speed movement, for instance, an occurrence of an abnormality cannot be detected so long as the actual position error does not exceeds the permissible value which is fixedly set in dependence on the maximum motor rotational rate, so that the servomotor associated with the machine movable section is permitted to be continually driven. As a consequence, an excessive electric current flows in the servomotor so as to permit the same motor to produce an excessive output torque, whereby the servomotor and the movable mechanism can be damaged.

SUMMARY OF THE INVENTION

The object of the present invention is to provide a detection apparatus which is capable of detecting an excessive position error in a servo system in an appropriate manner over a wide servomotor rotational rate region, so as to accurately and immediately determine an overload state of a servomotor and the like.

In order to achieve the above-mentioned object, the present invention provides an apparatus for detecting an excessive position error in a servo system of a type periodically effecting pulse distribution (distributing movement command pulses) in response to a movement command. This detection apparatus comprises means for storing a pulse distribution amount (number of distributed movement command pulses), means for calculating a permissible value of a position error in the servo system on the basis of the thus stored pulse distribution amount, and means for determining whether an actual position error exceeds the permissible value.

Preferably, the storing means is operable to store respective pulse distribution amounts in last plural pulse distribution periods, and the calculating means is operable to calculate the permissible value of the position error on the basis of the maximum value of these pulse distribution amounts.

As mentioned above, according to the present invention, a determination is made as to whether an actual position error in a servo system exceeds a permissible value of a position error which is calculated on the basis of the maximum value of pulse distribution amounts in last plural pulse distribution periods. Accordingly, by using the permissible value which varies with a change in a target moving speed, an occurrence of an excessive position error in the servo system due to abnormality of the servo system, overload state of a servomotor, interference between a movable section of a machine and a foreign object can be detected in an appropriate manner over a wide servomotor rotational rate range.

DESCRIPTION OF THE PREFERRED EMBODIMENT

Figures 1, 3:
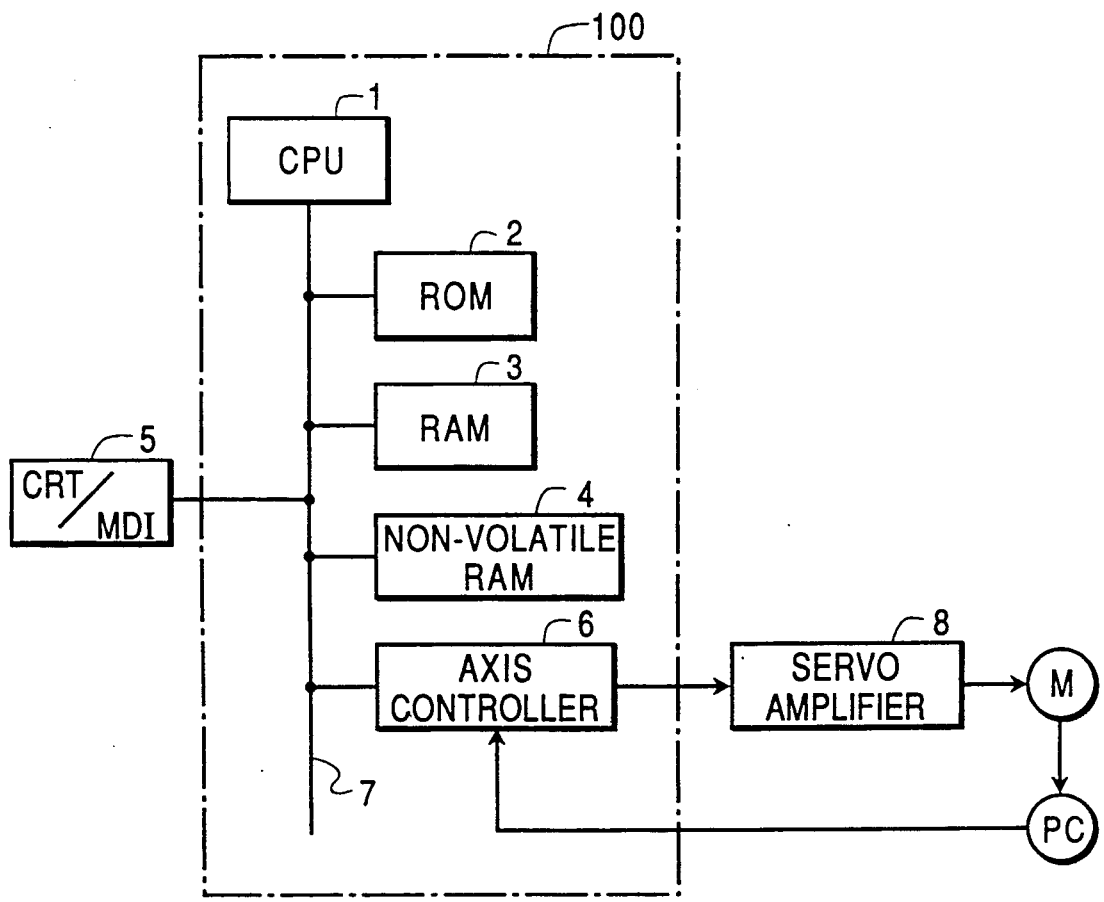
FIG. 1 is a schematic view showing an numerical control unit and its peripheral elements according to an embodiment of the present invention.
FIG. 3 is a view showing a storage table for storing pulse distribution amounts used by the excessive position error detecing process of FIG. 2.

In FIG. 1, a numerical control unit 100, which is installed on various machines having servomotors as drive sources, e.g., NC machine tools (not shown), comprises a central processing unit (hereinafter referred to as CPU) 1. A ROM 2, a RAM 3, a non-volatile RAM 4, a manual data input device (hereinafter referred to as CRT/MDI) 5 with CRT display unit, and an axis controller 6 are connected to the CPU 1 through busses 7. Further, servo amplifiers (only one servo amplifier associated with one axis is shown by reference numeral 8) for individual axes are connected to the axis controller 6, and each of the servo amplifiers is connected to a servomotor on which a pulse coder is mounted (only a pulse coder and a servomotor which correspond to the servo amplifier 8 are shown by reference numerals PC and M, respectively).

More specifically, the ROM 2 is arranged to store various control programs executed by the CPU 1. The non-volatile RAM 4 is arranged to store an NC program inputted through a tape reader (not shown), various set data inputted through the CRT/MDI 15 including a proportional coefficient K for calculation of a permissible value of a position error, later mentioned, etc. Further, the RAM 3 is provided for temporal storage of data, the results of calculation executed by the CPU 1, etc.

The axis controller 6, consisting of a microcomputer, for instance, cooperates with the servo amplifier 8 to form a so-called software servo system. Namely, the axis controller 6 is arranged to receive movement command pulses which are distributed from the CPU 1 at predetermined intervals of cycle in response to a movement command (a target moving position, a target moving speed) contained in an NC program which is read from the non-volatile RAM 4. The axis controller 6 then sums pulse distribution amounts for respective individual cycles, and then stores the summation result. Moreover, the axis controller 6 is arranged to decrement the thus stored summation result each time it receives a feedback pulse from the pulse coder P, so as to determine a position error by the difference between a target moving position and an actual current position. This axis controller 6 further supplies the servo amplifier 8 with a torque command which varies as a function of the difference between a commanded speed determined on the basis of the position error, and an actual speed determined on the basis of the feedback pulses, so as to drive the servomotor.

In the RAM 3, a table TB (FIG. 3) is provided, which consists of n+1 record sections for respectively storing the pulse distribution amounts supplied from the CPU 1 for last n+1 cycles.

In the following, an operation of the numerical control unit constructed as mentioned above will be explained.

Figure 2:
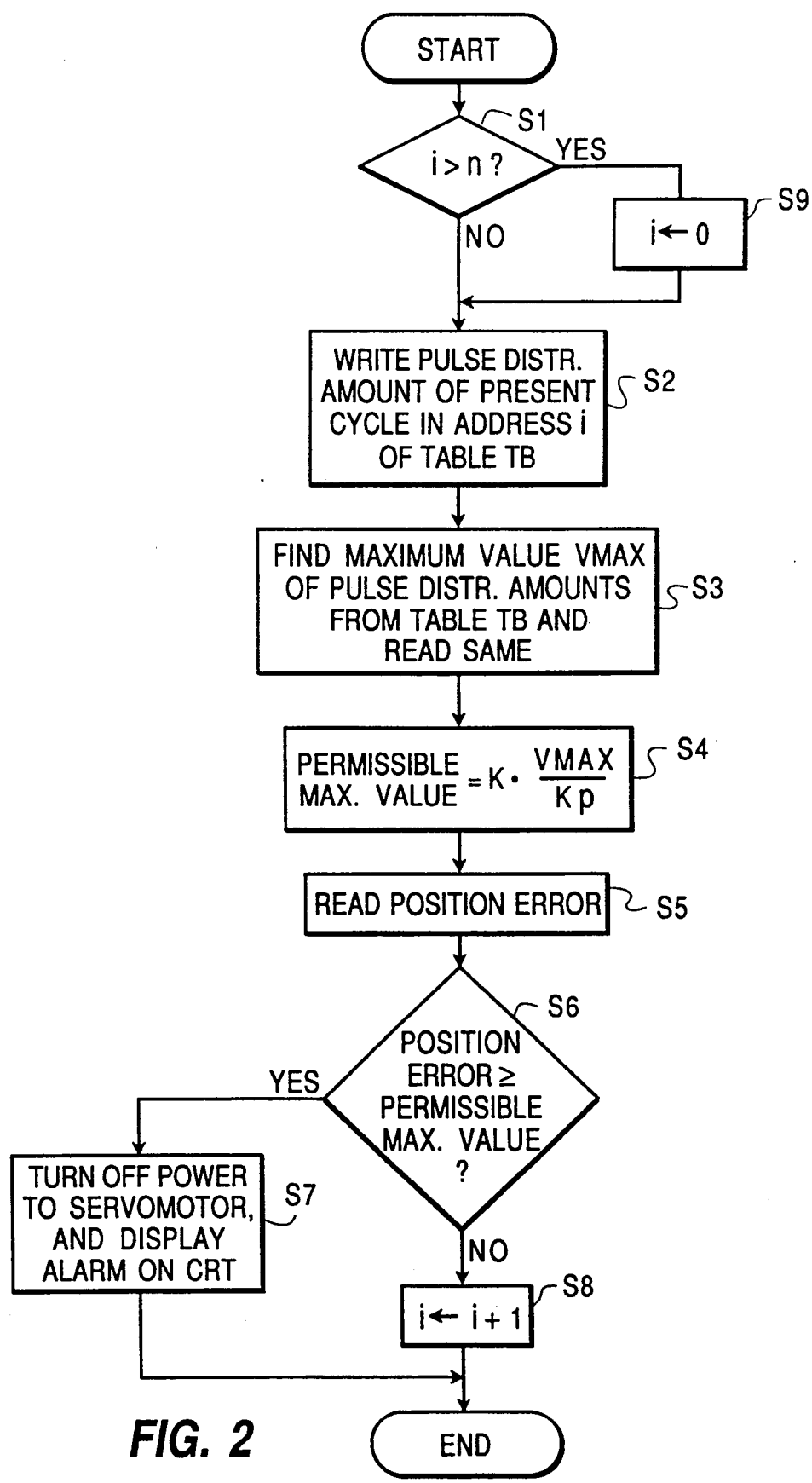
FIG. 2 is a flowchart showing a control program executed by the numerical control unit of FIG. 1 for excessive position error determining process.

The CPU of the numerical control unit executes the aforesaid movement command pulse distribution process, as task process, at predetermined intervals of cycle and also executes various processes, as task processes, different from the pulse distribution process, including an excessive position error detection process (FIG. 2) with follows the pulse distribution process.

Upon start of this excessive position error detection process, the CPU 1 first determines whether an index "i", representative of the i-th (i=0, 1, - - - , n) record section of the table shown in FIG. 3, is larger than "n" or not (step S1). The index "i" is initialized to a value of "0" upon supply of electric power. Here, since i=0 (<n), the result of the determination at step S1 is negative, and hence step S2 is entered. In step S2 a pulse distribution amount Vi obtained (in the current, i.e., immediately preceding movement command pulse distribution process) are stored in the i-th record section which corresponds to the index "i".

Next, the CPU 1 determines magnitude relationships among pulse distribution amounts V0−Vn which are respectively stored in the 0-th through n-th record sections, so as to find out the maximum value Vmax of these pulse distribution amounts (step S3). Here, the record sections other than the 0-th record section are respectively stored with "0", so that the pulse distribution amount V0 stored in the 0-th record section is determined as the maximum value. Then, the CPU divides the product of the maximum value Vmax of the pulse distribution amounts and a proportional coefficient K set beforehand by a position loop gain Kp in the servo system, to thereby calculate a permissible maximum value K·Vmax/Kp (step S4). The CPU reads out, from the axis controller 6, the error (actual position error) between a target position of the servomotor M at the current period of cycle and a current position thereof, and determines whether the actual position error is larger than the permissible maximum value (step S6).

If the acutual position error is larger than the permissible maximum value, the CPU 1 determines that an excessive position error occurs in the servo system due to any one or ones of the aforesaid various reasons (such as abnormality of the servo system, overload state of the servomotor, and interference between the machine movable section and a foreign object, etc.), and causes the servomotor M to stop and further causes the CRT/MDI 15 to display an alarm message on its CRT screen (step S7). On the other hand, if the actual position error is smaller than the permissible maximum value, the CPU adds "1" to the index "i" at step S8, and then completes the excessive position error detecting process at the current period of cycle.

When no excessive position error is produced, the CPU 1 continues to execute, at predetermined intervals of cycle, various processes including the aforesaid movement command pulse distribution process and the excessive position error detecting process. As a result, the index "i" is incremented one by one, and the summed pulse distribution amount is stored in the i-th record section of the table TB. When it is determined that the index "i" exceeds the value "n" representative of the final record section, i.e., when it is determined n+1 times of excessive position error detecting process has been completed so that all of the 0-th through n-th record sections has been stored with pulse distribution amounts respectively corresponding to these record sections, the CPU 1 sets the index "i" to a value of "0" (step 9). As a consequence, in step S2 following step S9, the pulse distribution amount at the current period of cycle ((n+2)th period of cycle) is stored in the 0-th record section in place of the pulse distribution amount V0 which has been stored at the initial period of cycle (n=0).

Whereupon, pulse distribution amounts in the subsequent periods of cycle are respectively stored in the first record section and the subsequent record sections. Further, the index "i" is set to a value of "0" each time the index "i" exceeds a value of "n". As a consequence, the pulse distribution amounts stored in the table TB are updated cyclically, so that the table is always stored with pulse distribution amounts in the last n+1 periods of cycle.

Consequently, the permissible maximum value of the position error is calculated in dependence on the last movement command (target moving position, target moving speed), so that the permissible maximum value assumes a larger value if the target moving speed increases whereas it assumes a smaller value if the target moving speed decreases. In other words, the permissible maximum value of the position error, i.e., the reference value for the excessive position error detection is suitably determined over a wide servomotor rotational speed region. Namely, even when the normal maximum delay appears in the servo system with increase of the target moving speed to the maximum servomotor rotational rate, as the target moving speed increases, the permissible maximum value is changed to increase to a value large enough to prevent an occurrence of the excessive position error from being erroneously determined, so long as the actual position error does not exceed the value corresponding to the normal maximum delay. On the other hand, as the target moving speed decreases, the permissible maximum value is changed to decrease to a value small enough to immediately detect an occurrence of an excessive position error if the actual position error exceeds a position error which is produced, for example, when an overload state of the servomotor at its low-speed movement is reached. The drive of the servomotor is stopped when the excessive position error is detected on the basis of the permissible maximum value which is variably changed, so as to achieve the protection of the servomotor and the servo system.

Although, in the foregoing preferred embodiment, the explanation has been given for the case where the present invention is applied to a software servo system, the present invention is not limited thereto. For example, the present invention may be applied to an ordinary hardware servo system. Further, in the embodiment, the invention is applied to a servo system of an NC machine tool. However, the present invention may be applied to various machines employing a servomotor as its drive source, such as an industrial robot.

We claim:

1. An apparatus for determining if an actual position error is an excessive position error in a servo system in which a pulse distribution amount of movement command pulses is periodically distributed in response to movement commands, the servo system having a position loop gain, comprising:
   storing means for storing the pulse distribution amount periodically distributed;
   calculating means for calculating a permissible value of a position error for the servo system on the basis of the pulse distribution amount stored in said storing means; and
   determining means for receiving the actual position error and determining whether the actual position error exceeds the permissible value.

2. An apparatus according to claim 1, wherein said calculating means includes means for calculating the permissible value on the basis of the pulse distribution amount and the position loop gain.

3. An apparatus according to claim 2, wherein said calculating means includes means for determining a maximum pulse distribution amount among the pulse distribution amounts stored in the storing means, for multiplying the maximum pulse distribution amount by a predetermined proportional coefficient to provide a product and for dividing the product by the position loop gain, to thereby calculate the permissible value.

4. An apparatus according to claim 1,
   wherein said determining means includes means for generating a warning signal indicative of an occurrence of an intolerable position error when the actual position error exceeds the permissible value, and
   wherein said apparatus further comprises means for responding to the warning signal and stopping the servo system associated with the warning signal.

5. An apparatus according to claim 1,
   wherein said storing means includes means for storing pulse distribution amounts for each respective pulse distribution period, and
   wherein said calculating means includes means for calculating the permissible value of the position error on the basis of a maximum value of the pulse distribution amounts.

6. An apparatus according to claim 5, wherein said calculating means includes means for calculating the permissible value on the basis of the maximum value of the pulse distribution amounts stored by said storing means and the position loop gain.

7. An apparatus according to claim 6, wherein said calculating means includes means for dividing a product of said maximum value of the pulse distribution amounts stored by said storing means and a proportional coefficient set beforehand by the position loop gain, to thereby calculate the permissible value.

8. An apparatus according to claim 5, wherein said apparatus is installed on a machine which responds to a warning signal to stop driving a servomotor associated with the warning singnal, wherein said determining means includes means for generating the warning signal when the actual position error exceeds the permissible value.

* * * * *